United States Patent
Azorsky et al.

(10) Patent No.: US 9,901,196 B2
(45) Date of Patent: Feb. 27, 2018

(54) PICTURE HANGER

(71) Applicants: Bryan Azorsky, Prairie Village, KS (US); Ben Gasser, Overland Park, KS (US)

(72) Inventors: Bryan Azorsky, Prairie Village, KS (US); Ben Gasser, Overland Park, KS (US)

( * ) Notice: Subject to any disclaimer, the term of this patent is extended or adjusted under 35 U.S.C. 154(b) by 154 days.

(21) Appl. No.: 14/791,793

(22) Filed: Jul. 6, 2015

(65) Prior Publication Data

US 2016/0000241 A1    Jan. 7, 2016

Related U.S. Application Data

(60) Provisional application No. 62/020,626, filed on Jul. 3, 2014.

(51) Int. Cl.
| A47G 1/17 | (2006.01) |
| A47G 1/20 | (2006.01) |
| B25H 7/02 | (2006.01) |
| F16B 1/00 | (2006.01) |

(52) U.S. Cl.
CPC .............. *A47G 1/17* (2013.01); *A47G 1/205* (2013.01); *B25H 7/02* (2013.01); *F16B 2001/0035* (2013.01)

(58) Field of Classification Search
CPC ......... Y10T 29/49899; Y10T 29/49901; Y10T 29/49895; Y10T 29/49904; A47G 1/205; A47G 1/0638; A47G 2001/0672; A47G 1/1606; A47G 1/17; B23P 19/10; B25B 11/002; B25B 11/02; B25H 7/02; F16B 2001/0035; G09F 7/04; G09F 2007/1852
USPC .................................................. 40/600, 761
See application file for complete search history.

(56) References Cited

U.S. PATENT DOCUMENTS

| 4,837,939 A * | 6/1989 | Pullen ................. B25H 1/0078 33/562 |
| 4,875,654 A * | 10/1989 | Chandonnet ............ A47G 1/17 248/206.5 |
| 2005/0193614 A1* | 9/2005 | Conrad ................. A47G 1/065 40/757 |

(Continued)

FOREIGN PATENT DOCUMENTS

DE          10228375 A1 *    1/2003    ............... B25H 7/02

OTHER PUBLICATIONS

Translation of DE10228375, generated Apr. 27, 2017.*

*Primary Examiner* — Christopher Besler
*Assistant Examiner* — Matthew P Travers
(74) *Attorney, Agent, or Firm* — Lathrop Gage L.L.P.

(57) ABSTRACT

Systems and methods for securing an object to a surface are disclosed herein. The system includes a mounting block having a first section with a first cutout for receiving a ferromagnetic chip, a second section with a second cutout, and a panel. The second cutout may be slightly smaller than the first cutout. The second section is secured to the first section such that the second cutout maintains the ferromagnetic chip in the first cutout. The panel has a front side and a back side, and the back side of the panel has a magnet attached thereto. The mounting block is releasably secured to a surface, such as a wall and the magnet is received in the second cutout such that the magnet is in magnetic communication with the ferromagnetic chip and the back side of the panel is flush with the second section.

12 Claims, 12 Drawing Sheets

(56) References Cited

U.S. PATENT DOCUMENTS

| | | | |
|---|---|---|---|
| 2010/0199598 A1* | 8/2010 | Townsend | F16M 13/02 |
| | | | 52/745.21 |
| 2011/0042542 A1* | 2/2011 | Russo | A47G 1/17 |
| | | | 248/467 |
| 2013/0167418 A1* | 7/2013 | Noterman | B44D 3/185 |
| | | | 40/773 |
| 2014/0263908 A1* | 9/2014 | Franklin | F16M 13/02 |
| | | | 248/309.4 |
| 2014/0353455 A1 | 12/2014 | Floyd et al. | |
| 2015/0208835 A1 | 7/2015 | Floyd et al. | |

* cited by examiner

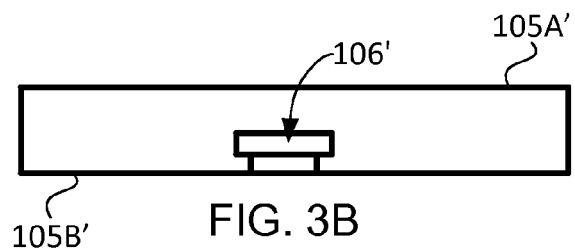
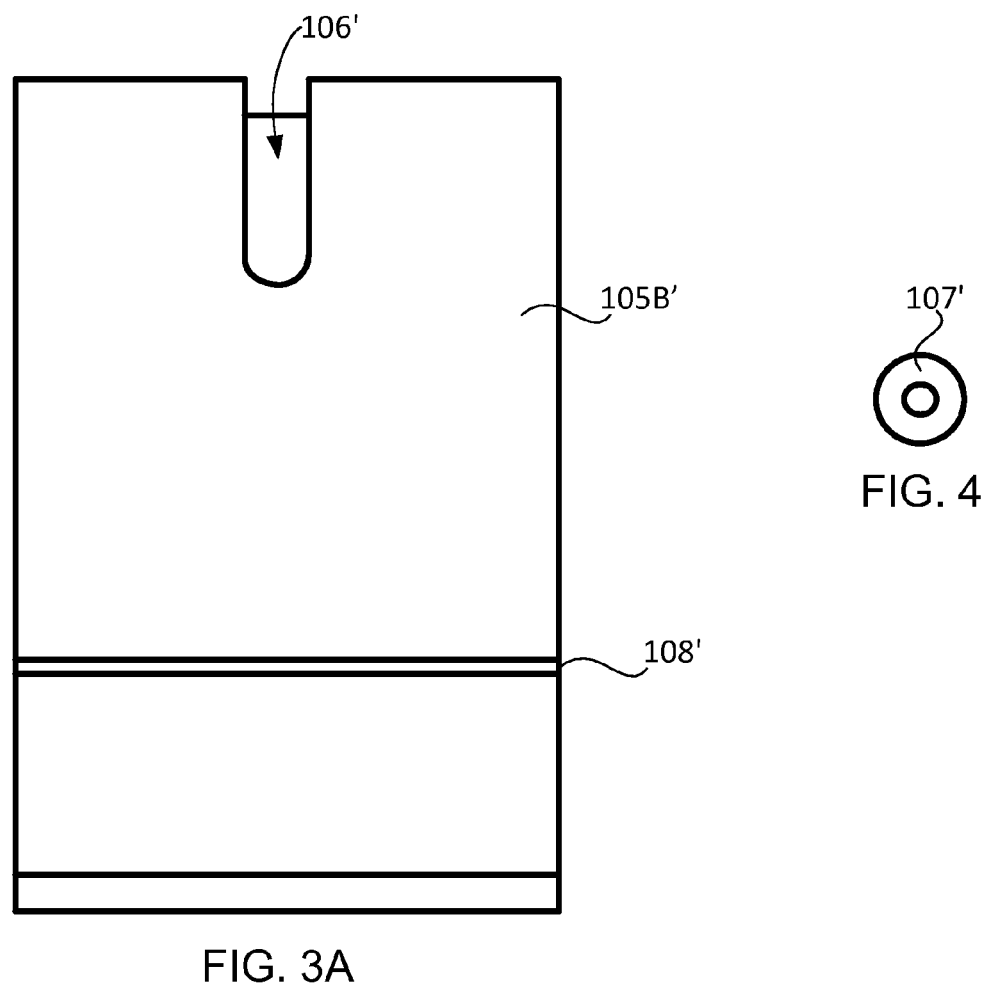

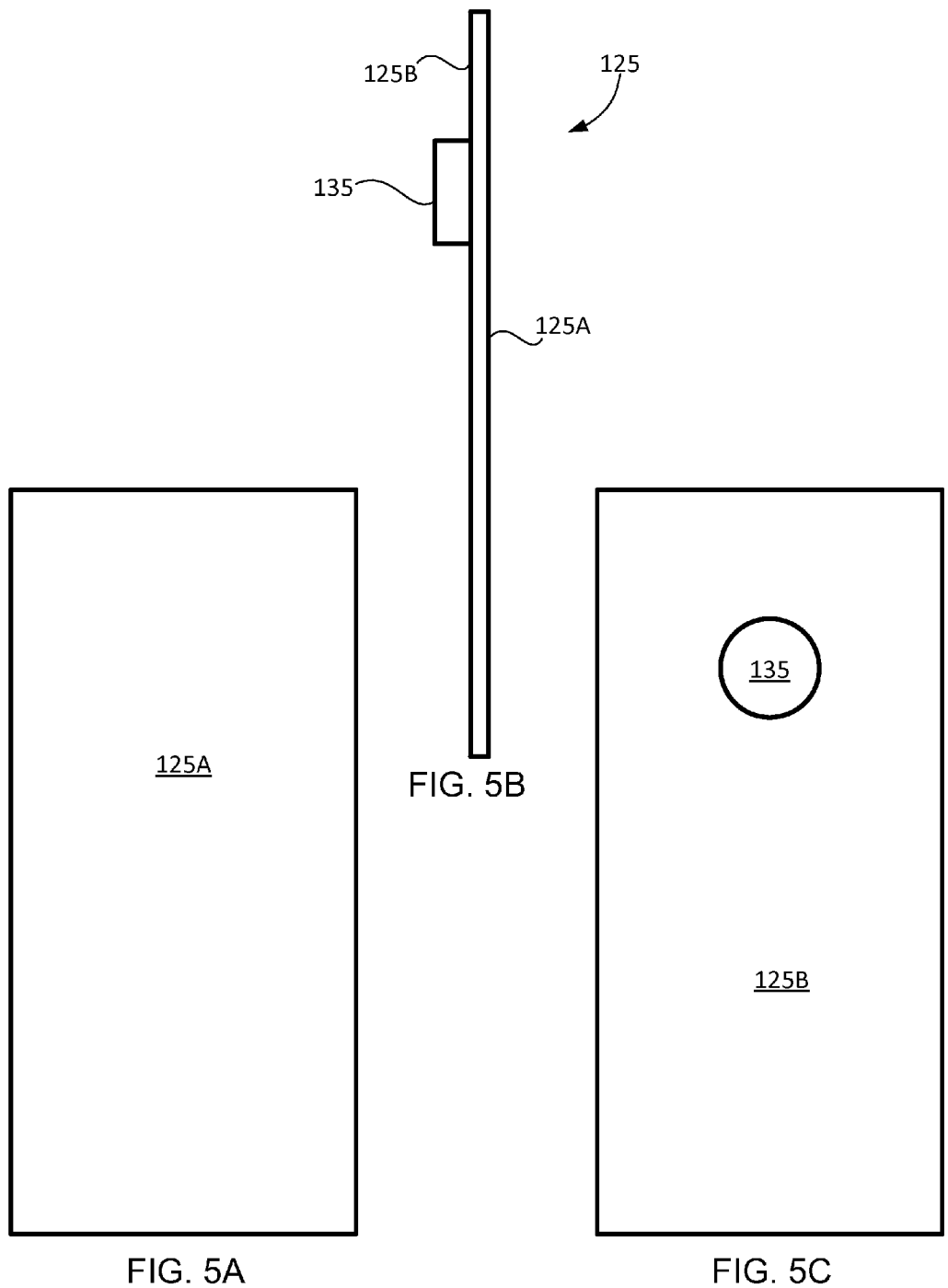

PICTURE HANGER

CROSS-REFERENCE TO RELATED APPLICATIONS

This application claims priority to U.S. Provisional Patent Application No. 62/020,626, filed Jul. 3, 2014, the disclosure of which is incorporated herein by reference in its entirety.

BACKGROUND

Displays have long been attached to and hung from surfaces such as walls and doors. Typically, these displays are attached using mechanical fasteners (e.g., nails, hooks, etc.). While mechanical fasteners are useful for many types of hanging applications, they tend to limit the user's ability to easily rearrange the display without having to fix the underlying surface. Moreover, mechanical fasteners are not well-suited for multi-dimensional displays.

SUMMARY

The following presents a simplified summary of the invention in order to provide a basic understanding of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, the system includes a mounting block having a first section with a first cutout for receiving a ferromagnetic chip, a second section with a second cutout, and a panel. The second cutout may be slightly smaller than the first cutout. The second section is secured to the first section such that the second cutout maintains the ferromagnetic chip in the first cutout. The panel has a front side and a back side, and the back side of the panel has a magnet attached thereto. The mounting block is releasably secured to a surface, such as a wall, and the magnet is received in the second cutout such that the magnet is in magnetic communication with the ferromagnetic chip and the back side of the panel is flush with the second section.

In another embodiment, a system for securing an object to a surface includes a mounting block having an aperture for receiving a ferromagnetic chip and a channel running laterally along a front side of the mounting block; and a panel having a front side and a back side, with a magnet attached to the back side. In a first configuration, the panel is maintained in communication with the mounting block by positioning the magnet in the aperture of the mounting block to trigger a magnetic force between the magnet and the ferromagnetic chip, thus holding the panel to the mounting block. In a second configuration, the panel is maintained in communication with the mounting block by placing a side of the panel in the mounting block channel.

In yet another embodiment, a method for securing an object to a surface, includes the steps of: providing a mounting block having an opening with a ferromagnetic chip embedded therein; a panel having a display side and a mounting side; a magnet; a jig; and a mounting template. The jig has a planar surface having a plurality of apertures formed therein and configured to hold the magnet. Each aperture has a position corresponding to a size of the panel; and a lip corresponding to a shape of the panel. The method further includes the step of using the jig to determine a correct placement of the magnet on the mounting side of the panel by (a) locating the aperture having the position corresponding to the size of the panel; (b) placing the magnet in the appropriate aperture; (c) depositing adhesive on the magnet; (d) placing the panel into the jig; and (e) allowing the magnet to adhere to the panel. Still further, the method comprises the steps of: using the mounting template to determine a correct placement of the mounting block on the surface; securing the mounting block to the surface; and positioning the magnet within the opening of the mounting block, the magnet thus holding the panel in communication with the mounting block via magnetic force.

BRIEF DESCRIPTION OF THE DRAWINGS

FIG. 3A is a front view of a mounting block according to another embodiment of the invention.

FIG. 3B is a top view of the mounting block of FIG. 3A.

FIG. 4 is a front view of a ferromagnetic chip according to another embodiment of the invention.

FIG. 5A is a front view of a panel according to one embodiment of the invention.

FIG. 5B is a side view of the panel of FIG. 5A showing a magnet attached thereto.

FIG. 5C is a back view of a panel according to FIG. 5B.

DETAILED DESCRIPTION

Figure 1A:
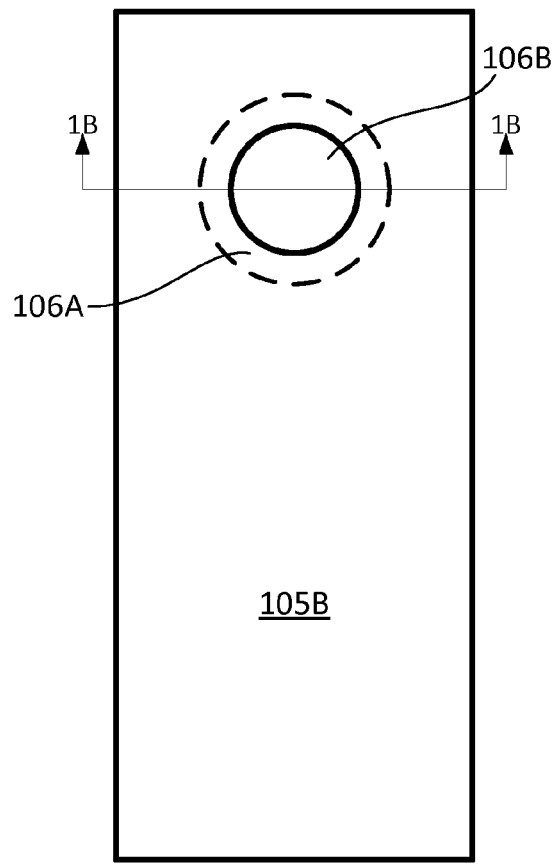
FIG. 1A is a front view of a mounting block according to one embodiment of the invention.
Figure 2:
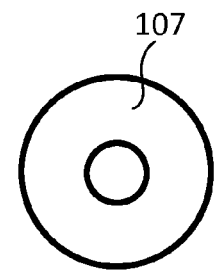
FIG. 2 is a front view of a ferromagnetic chip.
Figure 1B:
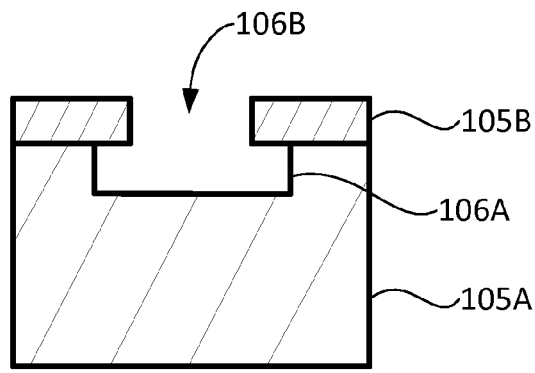
FIG. 1B is a cross-sectional view of the mounting block of FIG. 1.
Figure 1C:
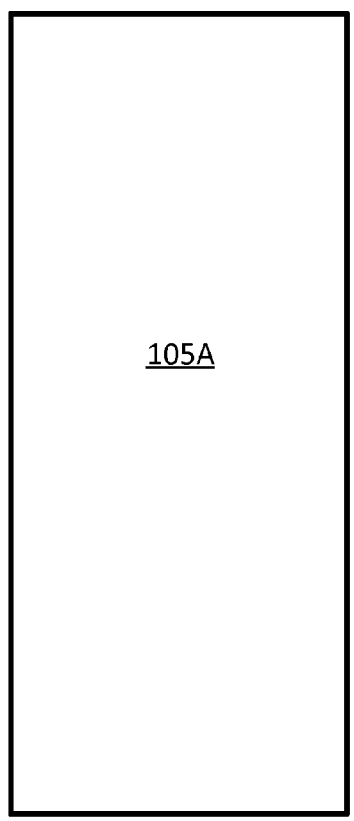
FIG. 1C is a back view of the mounting block of FIG. 1.
Figure 1D:
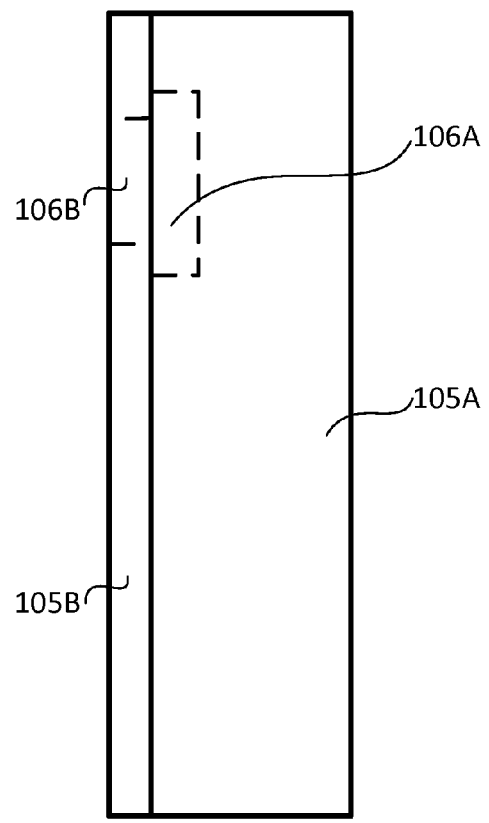
FIG. 1D is a side view of the mounting block of FIG. 1.
Figure 1E:
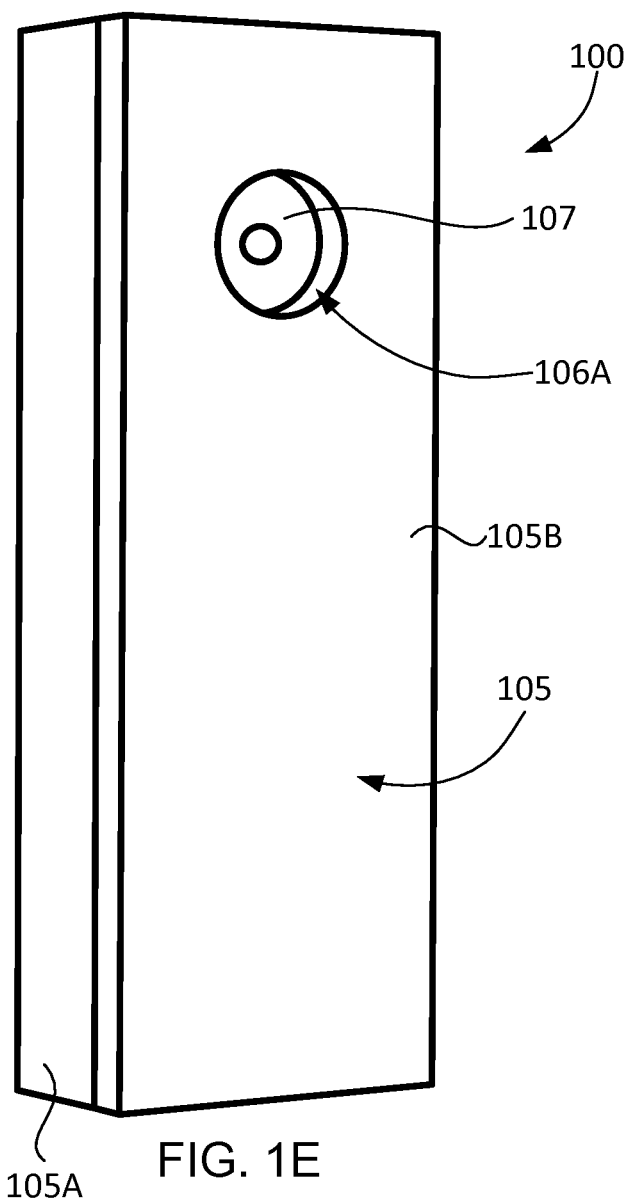
FIG. 1E is a perspective view of the mounting block of FIG. 1 showing a ferromagnetic chip embedded therein.

Unique systems and methods for attaching displays to a surface are described herein. With reference to FIGS. 1A-1E, 2, and 5A-5C, in one embodiment, the system 100 (FIG. 1E) generally includes a mounting block 105 equipped with a ferromagnetic material 107, means for securing the mounting 105 block to a surface, and a panel 125 having a magnet 135 attached thereto.

In one embodiment, illustrated in FIGS. 1A-1E, the mounting block 105 may include a first portion 105A and a second portion 105B. The first portion 105A may have an aperture 106A for receiving the ferromagnetic material 107 (e.g., a washer or other piece of material), and the second portion 105B may have an aperture 106B that generally corresponds to the aperture 106A in the first portion 105A such that a magnet 135 secured to a back side 125B of the panel 125 (FIG. 5) may adhere to the ferromagnetic material 107, the back side 125B of the panel 125 being flush with the second portion 105B. With the first portion 105A and the second portion 105B separated, the ferromagnetic material 107 may be received into the aperture 106A. The size and shape of the aperture 106A may be the same size and shape of the ferromagnetic material 107. When the ferromagnetic material 107 is in place, the second portion 105B may be secured to the first portion 105A such that the apertures 106A, 106B are aligned, for example, using adhesive, to prevent the ferromagnetic material 107 from shifting while in use.

In another embodiment, a mounting block may be equipped with grooves, channels, or any other appropriate means for receiving ferromagnetic material 107 such that a magnet 135 may adhere thereto. For example, FIGS. 3A-3F illustrate a mounting block 105' that is substantially similar to the mounting block 105 except as is shown and described herein. Mounting block 105' includes a channel 106' into which the ferromagnetic material 107' may be embedded. The channel 106' may be configured such that the magnet 135 attached to the panel 125 is received into the channel 106' and adheres to the ferromagnetic material 107', allowing a back side 125B of the panel 125 to be flush with a front side 105B' of the mounting block 105'.

In addition to the channel 106' for receiving the ferromagnetic material 107' and the magnet 135, the mounting block 105' may be further equipped with a groove 108' for optionally displaying the panel 125 on a table top, for example. The groove 108' may be specifically configured to hold the display 125 in place based on the display's particular size and shape.

Figure 3C:
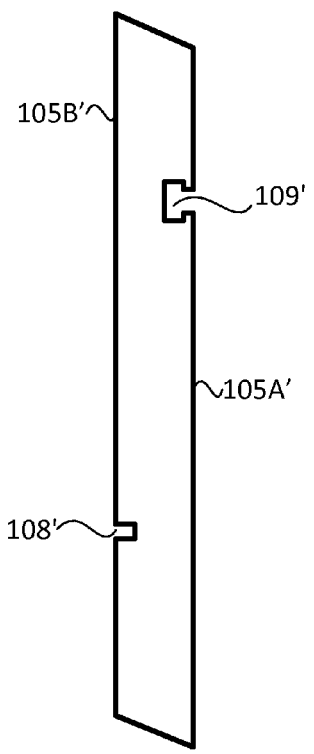
FIG. 3C is a side view of the mounting block of FIG. 3A.
Figure 3D:
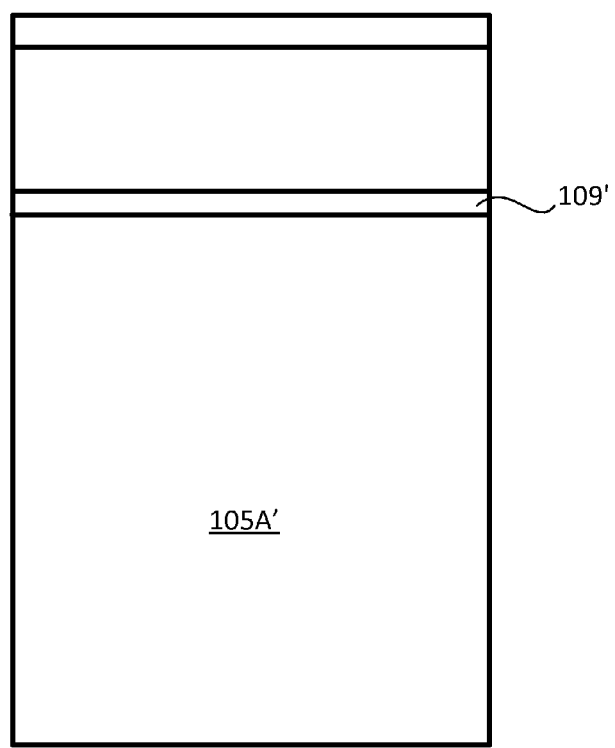
FIG. 3D is a back view of the mounting block of FIG. 3A.
Figure 3E:
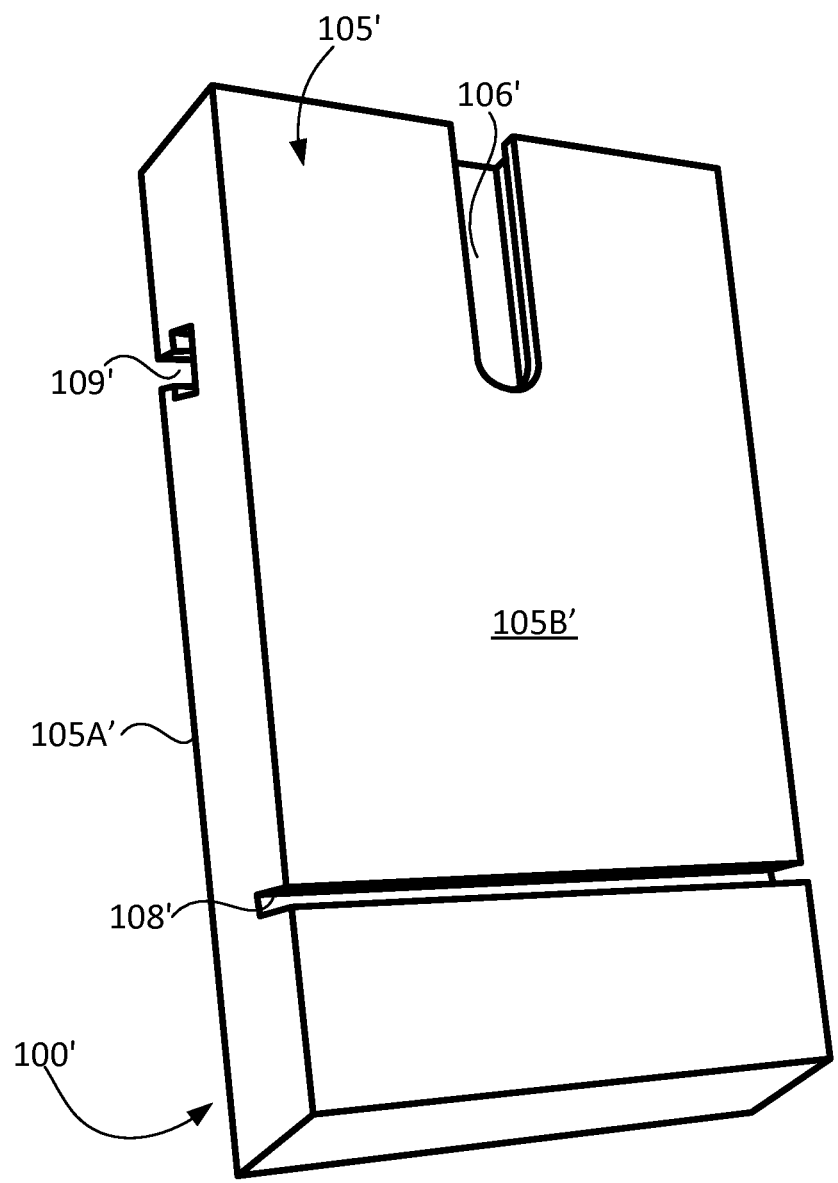
FIG. 3E is a perspective view of the mounting block of FIG. 3A.

The mounting block first portion 105A (or the mounting block back side 105A') may be secured to a surface using any appropriate attachment means, including but not limited to a screw, nail, hook, or adhesive. In some embodiments, it may be preferable to adhere the mounting blocks 105 and 105' to the surface using a removable adhesive, such as a Command Strip™ by 3M™, for example, such that the mounting blocks 105 and 105' may be easily removed from the surface and placed in another location. As shown in FIG. 3E, the mounting block 105' may have a slot 109' formed in the back side 105A' to receive mechanical attachment means such as nails, screws, and the like. While not shown in the figures, mounting block 105 may additionally have a slot substantially similar to slot 109'.

The magnet 135, which may be configured to generally correspond to the size and shape of the aperture 106A in the mounting block second portion 105B (or the channel 106'), may be secured to the back face 125B of the panel 125 at a predetermined position. The panels 125 may come in many different shapes and sizes, and it is generally desirable for the panel 125 to hang straight. Accordingly, the position of the magnet 135 may be predetermined based on the panel's shape and size to ensure correct and effective presentation. The first portion 125A of the panel 125 may be configured to display, for example, a picture printed thereon.

Figure 6:
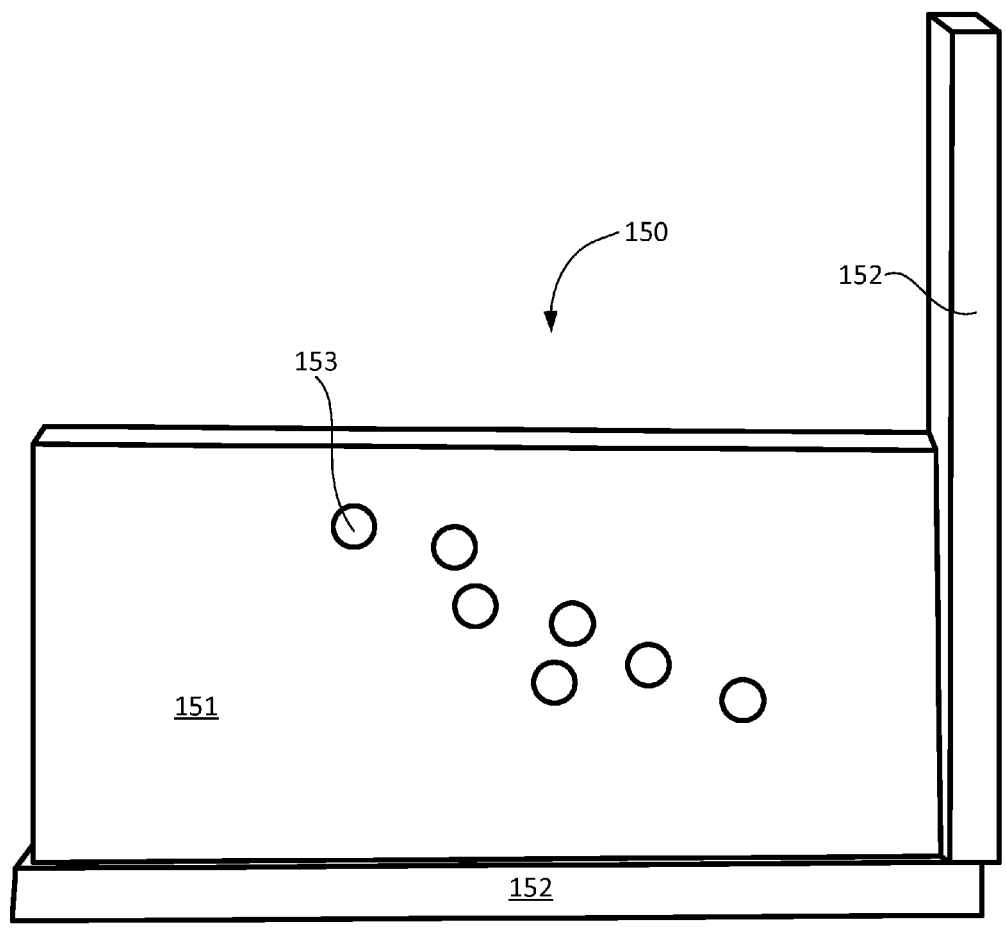
FIG. 6 is a top view of a jig according to one embodiment of the invention.

In one embodiment, a jig 150 (FIG. 6) may be used to place the magnet 135 in a desired position on the panel 125. The jig 150 may include a face 151 and a lip 152, and may be configured such that the lip 152 abuts at least a portion of the panel 125. For example, if the panel 125 is square, the jig 150 may be configured such that the lip 151 abuts two sides of the panel 125. As shown in FIG. 6, without the panel, the jig 150 may have several recesses 153 in the surface area 151 for holding the magnet(s) 135 desired to be attached to the panel 125. The magnet(s) 125 may be placed in the desired recess 153. Adhesive may then be placed on the magnet 135, after which the panel 125 may be positioned on the jig 150. Depending on the adhesive used, the panel 125 may be immediately attached to the magnet 135 such that the panel 125 and magnet 135 may be removed from the jig 150 and placed on the mounting blocks 105 or 105'. Alternately, the panel 125 may be allowed to rest in the jig 150 for a period of time to allow the adhesive to take hold.

The magnet 135 may be adhered to the panel 125 using any appropriate attachment means, for example, glue, epoxy, pressure sensitive adhesives, contact adhesives, et cetera. Persons having skill in the art may recognize that it is desirable that the magnet 135 remain adhered to the panel 125 when the panel 125 is separated from the mounting blocks 105 or 105'. Thus, it may be desirable for the mating surfaces of the panel 125 and the magnet 135 to be roughed (e.g., with sand paper or the like) prior to adhering the magnet 135 to the panel 125.

The panel 125 and the mounting blocks 105 or 105' may be manufactured from a variety of materials, including but not limited to cardboard, plastic, rubber, cork, wood, foam, foam core, glass, metal (e.g., aluminum, aluminum alloys, magnesium), paper, et cetera. The mounting blocks 105 or 105', and the panel 125, may be manufactured from the same or different material, or combination of materials.

Various methods may be employed for attaching the system 100 to a surface. In one method of attachment, a user may receive the mounting blocks 105 or 105' having a ferromagnetic chip 107 or 107' secured therein. The user may apply the desired attachment means to a backside of the first portion 105A or the backside 105A' of the mounting block 105, 105' or the surface, as required. The user may then secure the panel 125 to the mounting block 105, 105' by placing the magnet 135 secured to the back side of the panel 125B in communication with the ferromagnetic material 107, 107'. The user may then secure the mounting block 105, 105' to the surface using the adhesive. It shall be noted that the various steps described herein may be performed in a variety of orders.

Figure 7:
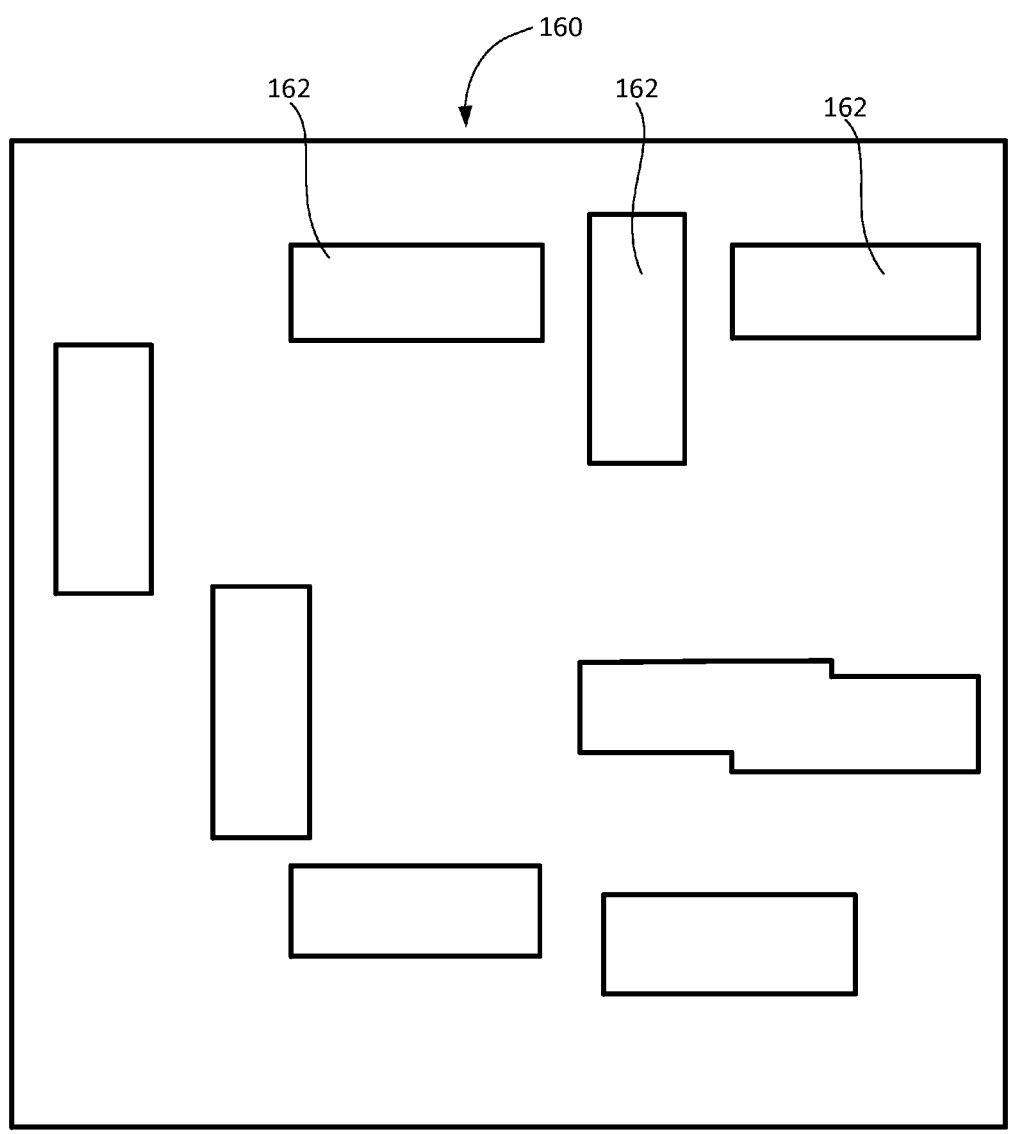
FIG. 7 is a front view of a template according to one embodiment of the invention.
Figure 8:
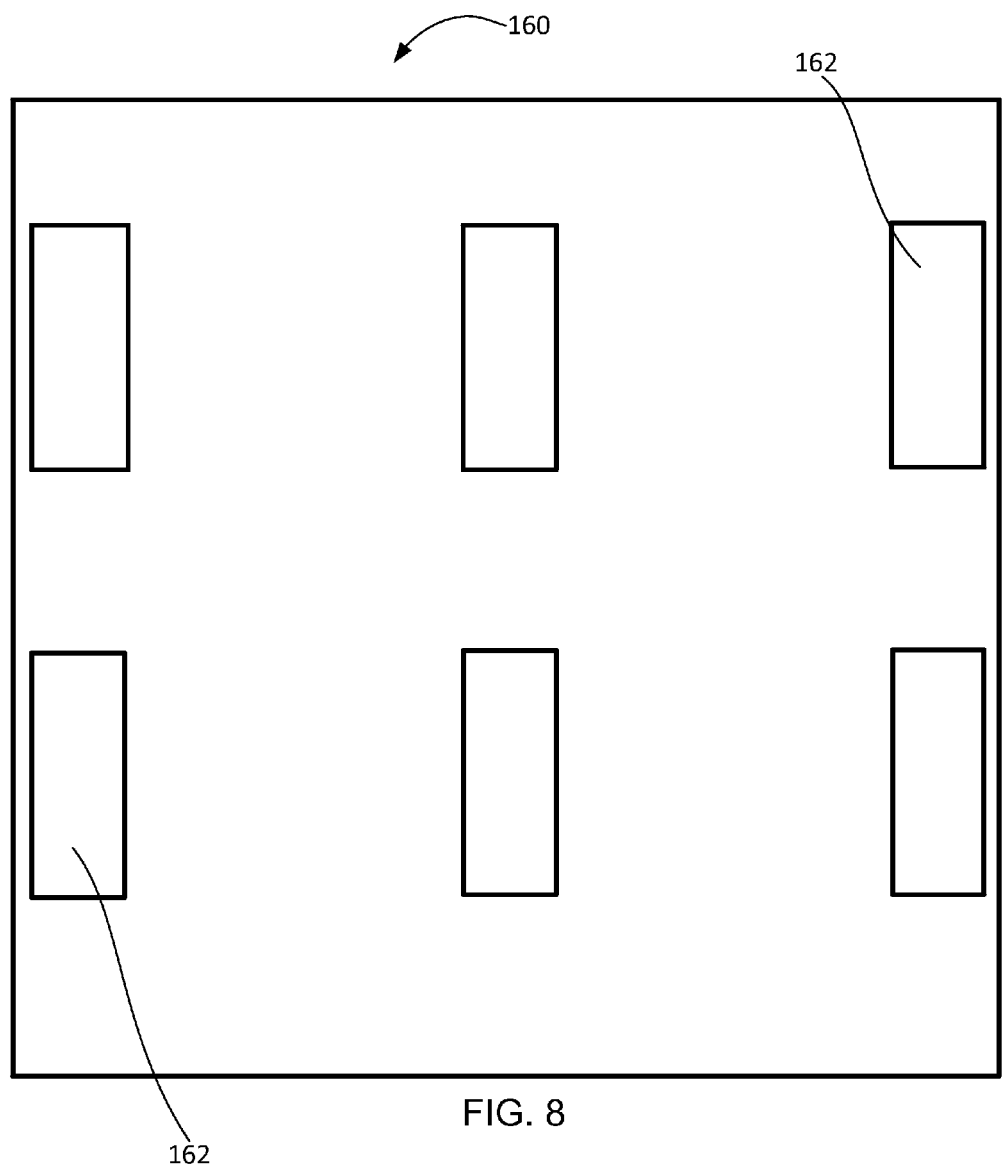
FIG. 8 is a front view of a template according to another embodiment of the invention.
Figure 9:
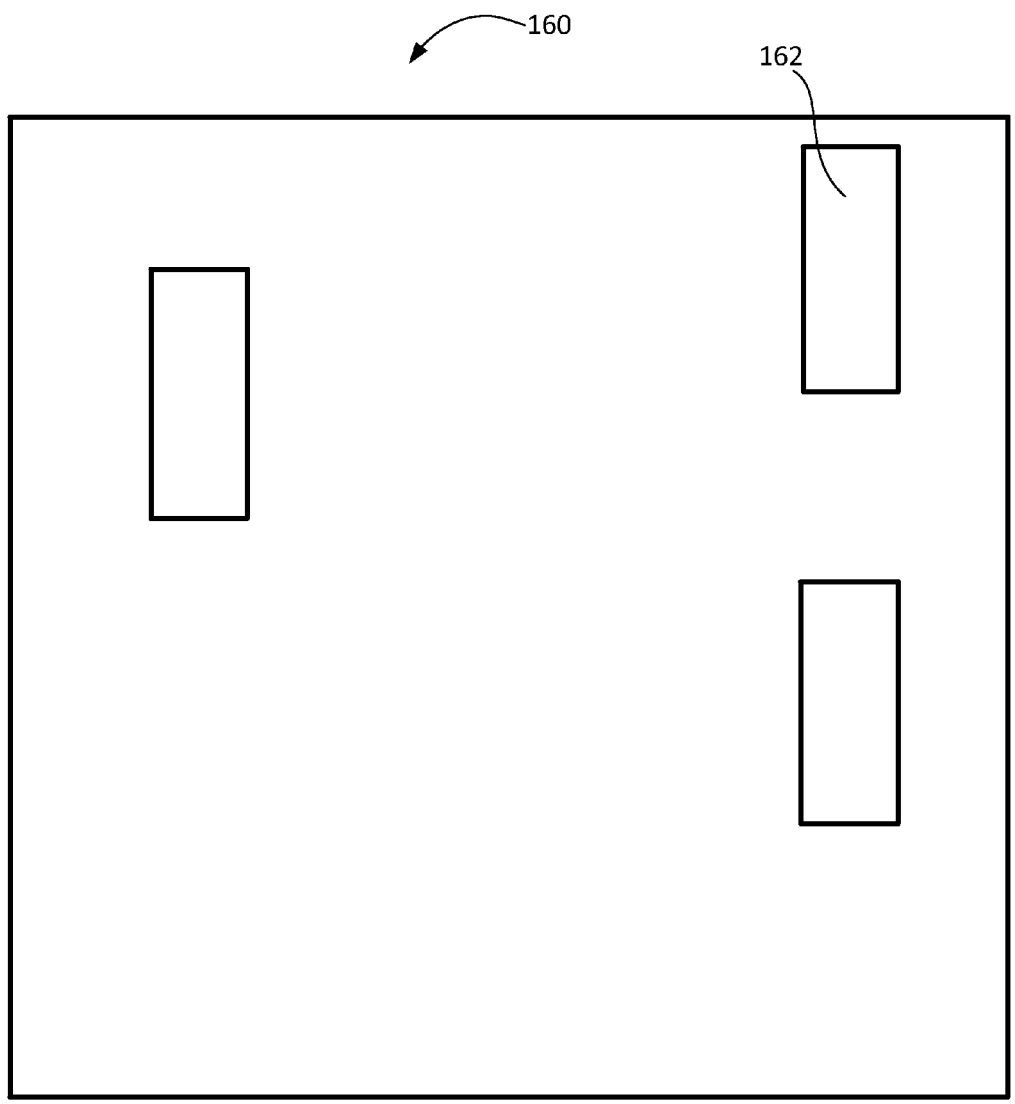
FIG. 9 is a front view of a template according to still another embodiment of the invention.

It may be recognized by those of skill in the art that certain placement of panels may enhance the aesthetics of an overall display. Accordingly, in one embodiment, a mounting template 160 may be utilized when securing multiple mounting blocks 105, 105' to the surface. The mounting template 160 (FIG. 7) may include several cutouts 162 into which the mounting blocks 105, 105' may fit. Thus, in a method of use, the mounting blocks 105, 105' are secured to the surface according to the various cutouts 162 in the template 160. FIGS. 7-9 illustrate examples of templates 160 having a plurality of cutouts 162 therein through which the mounting blocks 105, 105' may be secured to the surface.

Figure 10:
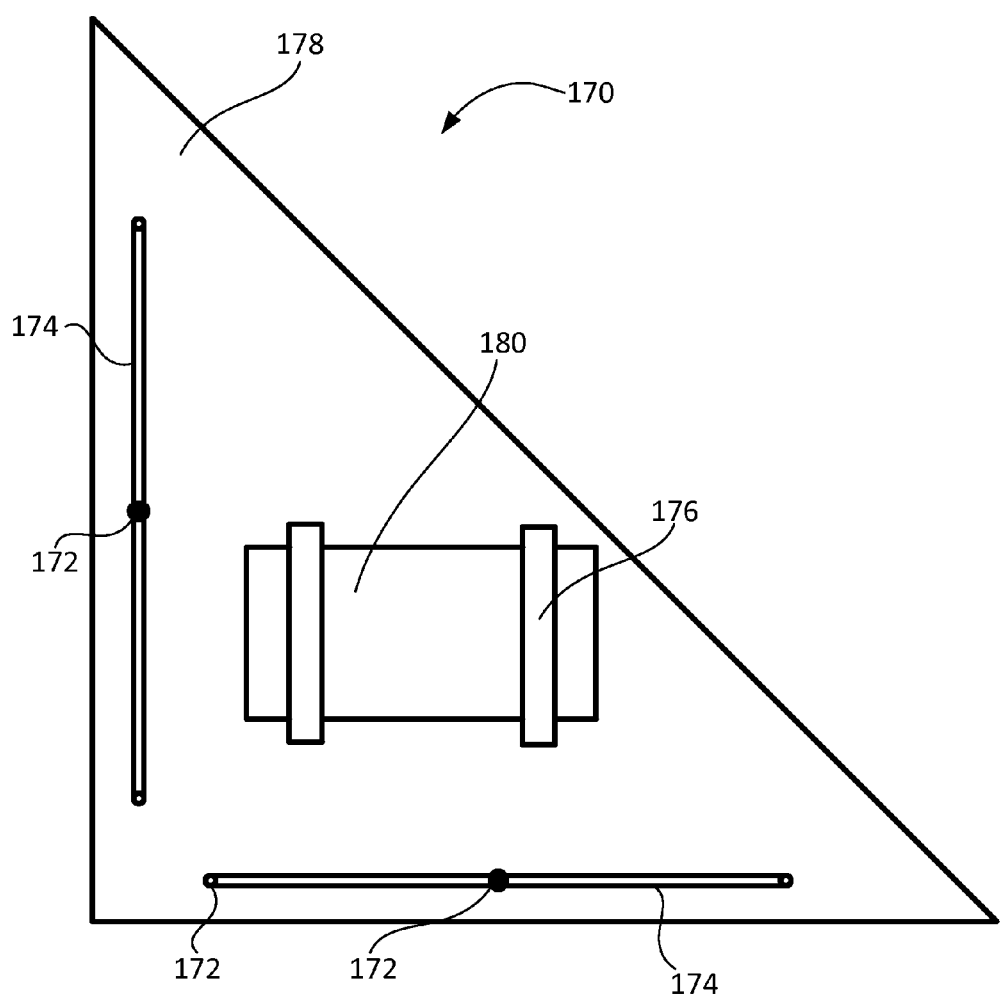
FIG. 10 is a top view of a mounting template according to yet another embodiment of the invention.

In another embodiment, a mounting template 170 may be provided with a plurality magnets 172 secured therein. The mounting template 170 may be, for example, a rectangular device having magnets 172 secured at either end, or as shown in FIG. 10, a triangular device (e.g., a right triangle) having several magnets 172. Use of template 170 may ensure that mounting blocks 105, 105' are placed on the surface at consistent intervals.

It is contemplated that the magnets 172 in the mounting template 170 may be slidable such that the height and/or width between mounting blocks 105, 105' may be varied by the user. For example, a user may desire greater distance between panels 125 on a larger wall and smaller distance between panels 125 on a smaller wall. Additionally, the size of the panels 125 may dictate a minimum distance between panels 125. The magnets 172 may thus be allowed to slide along a pathway 174 to a desired position and subsequently secured using a mechanical tightener, such as a wing nut.

In use, mounting blocks 105, 105' may be secured to the magnets 172 in the mounting template 170 via the ferromagnetic material 107, 107', and the mounting blocks 105, 105' may be prepared with the appropriate adhesive. It may be understood by those of skill in the art that an adhesive such as the Command Strip™ by 3M™ may be preferable for use with the mounting template 170 to allow ease in placement of the mounting blocks 105, 105'. Once prepared, the mounting template 170 may be placed in the desired position on the surface, and pressure may be applied to secure the mounting blocks 105, 105' to the surface. The mounting template 170 may then be pulled away from the mounting blocks 105, 105', breaking the magnetic attraction between the mounting template 170 and the mounting blocks 105, 105', thus leaving the mounting blocks 105, 105' on the surface. Panels 125 may then be secured to the desired mounting blocks 105, 105' using the methods described above. Use of the mounting template 170 may ensure that the mounting blocks 105 and 105' are hung at consistent heights and widths, as desired.

The mounting templates 160 or 170 may further include at least one spirit level to ensure level placement of the mounting blocks. Alternately, the mounting template 160, 170 may be equipped with means for holding a level or other device which may provide leveling capabilities (e.g., a smart phone 180 with a leveling app), such as elastic straps 176, a snap-in housing, or the like. It may thus be understood that a user may desire to ensure that the mounting template 160, 170 is level before securing the mounting blocks 105, 105' to the surface.

Many different arrangements of the various components depicted, as well as components not shown, are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of this invention. The description should not be restricted to the specific described embodiments.

What is claimed is:

1. A method for securing an object to a receiving surface, comprising the steps of:
   (1) providing:
      a mounting block having opposed front and back sides and first and second openings, the first opening extending from the front side and having a first perimeter, the second opening extending from and undercutting the first opening and being spaced apart from the front side, the second opening having a second perimeter different from the first perimeter;
      a ferromagnetic chip positioned in the second opening, the first perimeter spacing the ferromagnetic chip apart from the front side and preventing the ferromagnetic chip from passing through the first opening;
      a panel having a display side and a mounting side;
      a magnet;
      a jig, comprising:
         a planar surface having a plurality of apertures formed therein and configured to hold the magnet, each aperture having a position corresponding to a respective panel size; and
         a lip corresponding to a shape of the panel; and
      a mounting template;
   (2) using the jig to determine a correct placement of the magnet on the mounting side of the panel, comprising the steps of:
      (a) locating the aperture having the position corresponding to the size of the panel;
      (b) placing the magnet in the appropriate aperture;
      (c) depositing adhesive on the magnet;
      (d) placing the panel into the jig; and
      (e) allowing the magnet to adhere to the panel;
   (3) using the mounting template to determine a correct placement of the mounting block on the receiving surface;
   (4) securing the mounting block to the receiving surface; and
   (5) positioning the magnet within the first opening of the mounting block such that the magnet is in magnetic communication with the ferromagnetic chip and the mounting side of the panel is adjacent the mounting block front side, the magnet thus holding the panel in communication with the mounting block via magnetic force.

2. The method of claim 1, wherein the mounting template comprises a planar surface having a right-triangle configuration, wherein two sides of the planar surface each include at least one magnet secured therein, whereby using the mounting template to determine a correct placement of the mounting block on the receiving surface comprises the steps of:
   (f) temporarily attaching the magnets in the mounting template to at least one mounting block;
   (g) placing the mounting template in a position at the receiving surface;
   (h) securing the mounting block to the receiving surface; and
   (i) removing the mounting template from the mounting block.

3. The method of claim 2, wherein the mounting block is releasably adhered to the receiving surface using an attachment mechanism selected from the group consisting of: removable adhesive, a nail, a screw, and a hook.

4. The method of claim 3, wherein the mounting template includes at least one of a spirit level and means for securing an electronic device capable of running a level application.

5. A method for securing an object to a surface, comprising the steps of:
   (1) providing:
      a panel having a display side and a planar mounting side;
      a mounting block having opposed front and back sides and first and second openings, the first opening extending from the front side and having a first perimeter, the second opening extending from and undercutting the first opening and being spaced apart from the front side, the second opening having a second perimeter different from the first perimeter;
      a ferromagnetic chip positioned in the second opening, the first perimeter spacing the ferromagnetic chip apart from the front side and preventing the ferromagnetic chip from passing through the first opening; and
      a magnet;

(2) coupling the magnet to the planar mounting side of the panel;
(3) securing the mounting block to the surface such that the back side is adjacent the surface and the front side is spaced apart from the surface; and
(4) positioning the magnet in the first opening of the mounting block such that the magnet is in magnetic communication with the ferromagnetic chip and the mounting side of the panel is flush with the mounting block front side, the magnet holding the panel adjacent the mounting block through magnetic force.

6. The method of claim 5, wherein the step of coupling the magnet to the planar mounting side of the panel includes selecting a location on the planar mounting side and coupling the magnet to the planar mounting side at the selected location.

7. The method of claim 6, wherein the step of positioning the magnet in the first opening includes seating the magnet on a ledge defined by the first opening.

8. The method of claim 7, wherein the step of coupling the magnet to the planar mounting side of the panel includes adhering the magnet to the planar mounting side of the panel.

9. The method of claim 8, wherein the ferromagnetic chip is a washer.

10. The method of claim 9, wherein the mounting block front side includes a groove extending from one end of the mounting block to another end of the mounting block for selectively receiving an edge of the panel therein.

11. The method of claim 5, wherein the step of coupling the magnet to the planar mounting side of the panel includes adhering the magnet to the planar mounting side of the panel.

12. The method of claim 5, wherein the mounting block has an upper end and the second opening extends to the upper end.

* * * * *